United States Patent [19]

Harris

[11] 3,709,405
[45] Jan. 9, 1973

[54] VENDING MACHINE FOR PERIODICALS HAVING ARCUATE PATH EJECTION

[76] Inventor: Charles G. Harris, 1301 Orange Road, Culpeper, Va. 22701

[22] Filed: Oct. 29, 1970

[21] Appl. No.: 85,161

[52] U.S. Cl. ............... 221/209, 221/232, 221/274, 221/276, 271/42
[51] Int. Cl. ............................................... B65h 3/24
[58] Field of Search......221/40, 42, 43, 56, 209, 230, 221/232, 244, 274, 276; 194/10, 54, 71; 271/42

[56] References Cited

UNITED STATES PATENTS

| | | | |
|---|---|---|---|
| 1,817,740 | 8/1931 | Dunn | 221/274 |
| 3,107,770 | 10/1963 | Short | 221/42 X |
| 3,168,212 | 2/1965 | Edwards | 221/231 X |
| 2,501,434 | 3/1950 | Cameron | 221/274 X |

*Primary Examiner*—Robert B. Reeves
*Assistant Examiner*—David A. Scherbel
*Attorney*—Griffin, Branigan and Kindness

[57] ABSTRACT

A newspaper/magazine (periodical) vending machine which includes a feeder mechanism that rotates the item to be vended through an arc is disclosed. The feeder mechanism includes a carriage arm that is rotatably attached at one end to a fixed vertical shaft. The other end of the carriage arm supports a feeder shaft in vertical alignment. A paralleling arm parallels the carriage arm and moves therewith to prevent movement of the feeder shaft. A mechanical linkage, that includes a horizontal shaft having cranks at either end, a tension wire and a link, connects the carriage arm to an operating handle. When the operating handle is moved, the horizontal shaft rotates and causes the tension wire to move which in turn causes movement of the feeder shaft in an arcuate manner. A return spring is attached to the carriage arm to return the carriage arm to its normal position when the operating handle is released. In one embodiment of the invention, suitable for use with relatively thin magazines and newspapers, the feeder shaft has a weight attached to its upper end and a feeder foot attached to its lower end. The feeder foot has pins that project into the top newspaper/magazine of a stack of horizontally disposed newspapers/magazines. When the feeder shaft is moved by the operation of the operating handle, the top newspaper/magazine is moved and vended through a vending slot. In an alternate embodiment, a hook replaces the feeder foot and hooks the rear of the top newspaper/magazine. The alternate embodiment is suitable for use with relatively thick newspapers/magazines and includes an elevator to raise the stack each time an item is vended.

21 Claims, 10 Drawing Figures

PATENTED JAN 9 1973

INVENTOR
CHARLES G. HARRIS

BY *Griffin, Branigan & Kindness*

ATTORNEYS

INVENTOR
CHARLES G. HARRIS

BY *Griffin, Branigan & Kindness*
ATTORNEYS

VENDING MACHINE FOR PERIODICALS HAVING ARCUATE PATH EJECTION

BACKGROUND OF THE INVENTION

This invention is directed to vending machines and more particularly to newspaper/magazine (periodical) type vending machines.

While various types of newspaper/magazine vending machines have been proposed and are in use, they have been generally unsatisfactory for a variety of reasons. Many of them have been exceedingly complicated, making them expensive to manufacture and maintain. Some have lacked the flexibility to dispense newspapers/magazines of varying thicknesses, i.e., they are limited to dispensing newspapers or magazines of a generally fixed thickness. Others cannot dispense relatively thin newspapers/magazines. In addition, because of their manner of construction, many of them have been easily looted and vandalized.

Prior art newspaper/magazine vending machines can be classified in three general categories. In one category are vending machines wherein the stack of newspapers/magazines is held in a generally vertical plane. In the second category the stack is held in an inclined plane. In the third category the stack of newspapers/magazines is held in a generally horizontal plane. This invention falls in the latter catagory. One of the major problems with newspaper/magazine vending machines that hold a stack of these items in a generally horizontal plane and vend through a vending slot is the adhesion problem that occurs between adjacent items. While this problem is of limited importance when the newspapers/magazines are relatively thick and heavy, it becomes of increasing importance as the thickness and weight of the newspapers/magazines are reduced. Some prior art newspaper/magazine vendors have attempted to solve this problem by including stops to prevent movement of the second to the top item when the top item is vended. Others vend from the bottom rather than the top of the stack. However none of these solutions have been entirely successful, particularily when the newspapers/magazines to be dispensed have been very thin, such as when a stack of 100 of the items has a thickness of about 4 inches, for example.

Therefore, it is an object of this invention to provide a new and improved newspaper/magazine vending machine.

It is also an object of this invention to provide a newspaper/magazine vending machine that is relatively uncomplicated and therefore inexpensive to manufacture and maintain.

It is another object of this invention to provide a newspaper/magazine vending machine that is easy to load and is versatile in that it can vend newspapers/magazines of varying thicknesses.

It is yet a further object of this invention to provide a newspaper/magazine vending machine that overcomes the adherence problem between the top item of a horizontal stack of relatively thin newspapers/magazines and the next item in the stack without requiring the use of a complicated mechanism.

It is a still further object of this invention to provide a new and improved newspaper/magazine vending machine that includes an elevator to raise a horizontally disposed stack of newspapers/magazines each time a newspaper/magazine is vended, the elevator being raised by a variable amount which depends on the thickness of the newspapers/magazines being vended.

SUMMARY OF THE INVENTION

In accordance with principles of this invention, a new and improved newspaper/magazine (periodical) vending machine is provided. The vending machine includes a feeder mechanism that rotates through an arc. The feeder mechanism includes a carriage arm rotatably attached at one end to a vertical shaft. The other end of the carriage arm supports a vertically disposed feeder shaft. A mechanical mechanism including a horizontal shaft, cranks and linkages connects the carriage arm to an operating handle located exterior to the housing of the machine. When the operating handle is moved, the feeder mechanism moves the feeder shaft through said arc. The movement causes the top newspaper/magazine of a horizontal stack of newspapers/magazines to be vended through a vending slot located in the housing.

In accordance with further principles of this invention, a weight is attached to the upper end of the feeder shaft and a feeder foot is attached to the lower end. The feeder foot lies on the top of the stack of horizontally disposed newspapers/magazines. Each time the feeder shaft is moved by the operation of the operating handle of the newspaper/magazine vending machine, the feeder foot interacts with the top item in the stack and moves it through an arc. Arcuate movement ends when the top item partially projects through the vending slot. It is the arcuate movement that breaks the adherence between the top newspaper/magazine and the next item in the stack.

In accordance with alternative principles of this invention, the feeder foot is replaced by a hook-shaped foot which hooks over the rear of the top item of the stack of horizontally disposed newspapers/magazines. Again, when the operating handle is moved, the feeder shaft moves to cause movement of the hook-shaped foot. Movement of the hook-shaped foot moves the top item until it projects through the vending slot.

In accordance with still further principles of this invention an elevator for raising the horizontal stack of newspapers/magazines is provided. The elevator is connected to the operating handle so that each time the operating handle is moved to vend an item, the stack is raised an incremental distance, the incremental distance being related to the individual thickness of the newspaper/magazine being vended. Further, the elevator is adjustable so the stack can be raised different incremental distances in accordance with the thickness of the individual items.

In accordance with still further principles of this invention, the vending slot is covered by a cover that is locked in place prior to vending movement of the operating handle so as to prevent access to the interior of the vending machine. In addition, the operating handle is locked in a closed position by a coin operated mechanism whereby a suitable coin must be inserted into the vending machine prior to the operation thereof.

It will be appreciated from the foregoing brief summary of the invention that a new and improved newspaper/magazine vending machine is provided by the invention. Because the machine operates on an arcuate movement principle, a single newspaper/magazine moves from the stack each time the feeder mechanism is operated, rather than a plurality. More specifically, arcuate movement of the top item easily breaks the adherence between the top item and the next item in the stack whereby only a single item is moved rather than a plurality of items. Straight or linear movement does not as easily break this adherence. In addition to reducing the adherence problem, which is of great importance with respect to relatively thin newspaper or magazines vendors, the invention is mechanically uncomplicated. Moreover, because an elevator is provided the invention is versatile in that it can raise the stack different incremental distances depending upon the thickness of the item to be dispensed. Hence, the invention can accommodate newspapers/magazines having thicknesses that vary over a relatively wide range (i.e., from thin to thick).

BRIEF DESCRIPTION OF THE DRAWINGS

The foregoing objects and many of the attendant advantages of this invention will become more readily appreciated from the following detailed description of the invention when taken in conjunction with the accompanying drawings, wherein.

DESCRIPTION OF THE PREFERRED EMBODIMENTS

Figures 1, 2A:
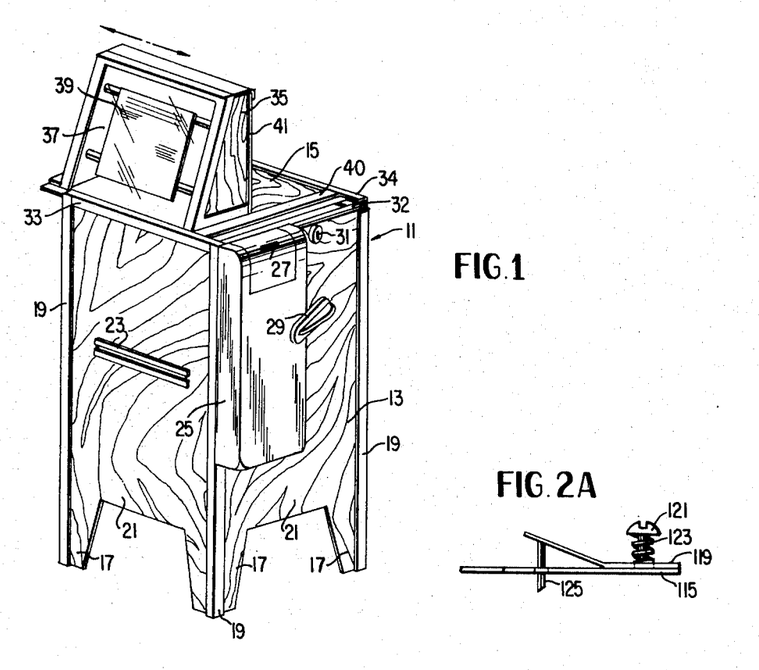
FIG. 1 is a pictorial diagram illustrating one embodiment of a cabinet suitable for housing the mechanism of the invention.
FIG. 2A is a cross-sectional diagram illustrating the feeder foot used in the mechanism of the invention illustrated in FIG. 2.

FIG. 1 illustrates a cabinet 11 suitable for housing a newspaper/magazine (periodical) vending mechanism formed in accordance with the invention. The cabinet 11 generally comprises a box-shaped lower section 13 and a sliding lid 15. Attached to the bottom of, or formed as a part of, the lower section 13 are four legs 17, only three of which are visible in FIG. 1. In the form illustrated in FIG. 1, the lower section 13 includes four vertically disposed side corners 19 formed of angle iron. Four sides 21 are mounted between the side corners 19. The sides are formed of a sheet material such as wood, sheet metal or aluminum, for example. Alternatively, the entire box-shaped lower section 13 can be formed from a single sheet of material, such as an aluminum sheet, for example, and joined together at a single joint in any suitable manner, as is well known in the cabinet art.

A horizontally disposed vending slot 23 is located in one side (the front side) of the lower section. A coin box 25 is mounted on an adjacent side (the right side is used in FIG. 1). The coin box 25 includes a slot 27 and an operating handle 29. While any of various types of well known coin boxes can be used with the invention, in general the coin box includes a means that prevents the operating handle 29 from being rotated until a suitable coin or coins have been inserted into the coin slot 27. After this action occurs, the operating handle is released and can be rotated through a predetermined arc when a suitable pressure is applied to it. A lock 31 is included on the same side of the cabinet as is the coin box 25.

The sliding lid 15 slides in a horizontal plane on a frame 32 inside of front and rear cooperating top angle iron members 33 and 34. The sliding lid 15 supports a display cab 35 which is generally triangular in cross-section and has a transparent window 37 as its front surface. The display cab 35 supports a display copy 39 of the newspaper/magazine being vended. The display cab also includes a sliding back 41 to allow access to the interior of the display cab so that the newspaper/magazine (periodical) being displayed can be changed when the newspaper/magazine being vended is changed.

When the sliding lid 15 is moved to the left as illustrated by the arrow in FIG. 1, access into the lower section 13 is provided. This access allows newspapers/magazines to be stacked in a horizontal plane inside of the lower section in the manner hereinafter described. When the sliding lid 15 is moved to the right, it closes the access opening. The lock 31 co-acts with a metal edge strip 40 located on the edge of the sliding lid 15 to lock the access opening closed to prevent unauthorized entry into the interior of the newspaper/magazine vending machine. Preferably, the sliding back 41 of the display cab 35 will only slide to the right (as viewed in FIG. 1) to provide access to the interior of the display cab. Moreover, preferably, sliding to the right is prevented by the upper edge of the coin box 25 when the sliding lid 15 is locked in its closed position. Hence, access to the display cab 35 is also prevented when the sliding lid 15 is locked in the closed position.

Figure 2:
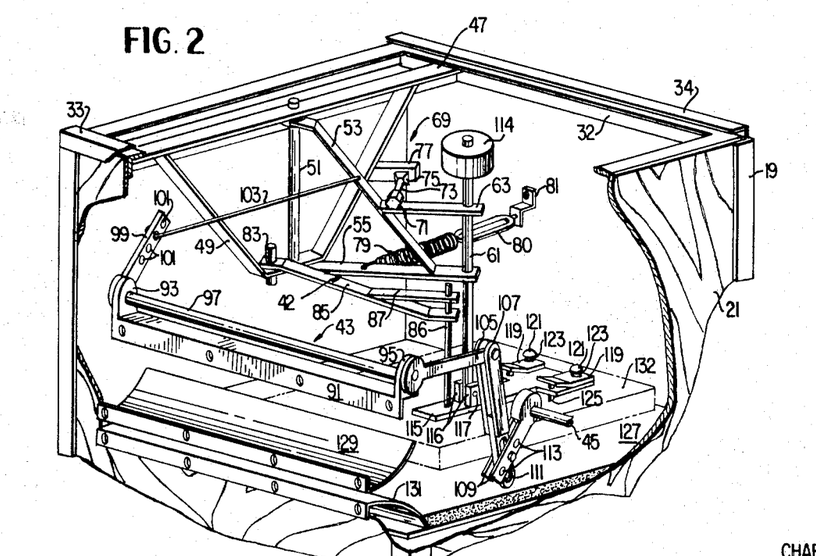
FIG. 2 is a pictorial diagram partially broken away illustrating one embodiment of the mechanism of the invention mounted in a cabinet of the type illustrated in FIG. 1.

FIG. 2 pictorially illustrates the feeding mechanism of one embodiment of a newspaper/magazine vending machine formed in accordance with the invention mounted in a cabinet of the type illustrated in FIG. 1. In general, the feeding mechanism comprises a carriage mechanism 42 connected by a mechanical connecting mechanism 43 to an operating handle shaft 45 on which is mounted the operating handle 29.

The carriage mechanism comprises a section of angle iron 47 attached by welding, riveting or bolting to the lower side of the frame 32 on which the sliding lid 15 slides. The section of angle iron 47 is located parallel with and adjacent to one side of the cabinet 13 (the left side as illustrated in FIG. 2). Attached beneath the section of angle iron 47 is a generally U-shaped frame 49. The frame 49 is preferably welded, but may be riveted or bolted, at its leg terminations to the section of angle iron 47.

A vertically disposed carriage shaft 51 is fixedly held between the section of angle iron 47 and the cross-member of the U-shaped frame 49. Upper and lower arms 53 and 55 project inwardly and toward one another from the carriage shaft 51 and at one end are rotatably attached thereto. The upper arm 53 meets and is welded to the lower arm 55 at a point intermediate the ends of the lower arm. Hence, the lower arm projects beyond the junction point. The lower arm 55 has a circular aperture having a vertical axis located near its outwardly projecting end. A feeder shaft 61 passes through this circular aperture. Projecting outwardly from the upper arm 53, parallel to the lower arm 55, is a support arm 63. The support arm 63 also includes a cylindrical aperture that has a vertical axis. The feeder shaft 61 also passes through this cylindrical aperture. By this manner of mounting, the feeder shaft 61 is maintained in vertical alignment at all times.

The support arm 63 also supports an adjustable stop 69. The adjustable stop 69 comprises a cylindrical element 71 having a cylindrical threaded aperture which has an axis that is at generally right angles to the axis of the support arm 63. A threaded bolt 73 fits into the threaded aperture in the cylindrical element 71. The rearward end of the threaded bolt 73 is covered by a rubber bumper 75. The rubber bumper 75 impinges on a stop bar 77 attached to the rear most leg of the U-shaped frame 49. By rotating the threaded shaft 75 the "stop" position of the feeder shaft 61 can be varied. A return coil spring 79 and a coupling loop 80 are attached between a bracket 81, that is attached to the rear of the cabinet 13, and the lower arm 55. The return coil spring 79 forces the rubber bumper 75 against the stop bar 77.

A paralleling shaft 83 is mounted in parallel with, and in front of, the carriage shaft 51 and projects upwardly from the cross-member of the U-shaped frame 49. A paralleling arm 85 is rotatably attached to the paralleling shaft 83 and projects outwardly and downwardly, in parallel with the plane defined by the upper arm 53 and the lower arm 55. The other end of the paralleling arm 85 is rotatably attached to a foot shaft 86 that is fixedly attached to, and projects upwardly from, the front tip of the hereinafter described feeder foot. A support arm 87 projects from the paralleling arm 85 to the foot shaft 86 to maintain the vertical alignment of the foot shaft.

As previously noted, the upper and lower arms 53 and 55 and the paralleling arm 85 are rotatably mounted on their respective shafts. Further, the feeder shaft 61 is rotatably mounted in its vertical position. In addition, the paralleling bar 85 and the support arm 87 are rotatably attached at their outer ends to the foot shaft 86. Hence, the various arms and the feeder and foot shafts are free to move through an arc, such movement being hereinafter described.

The mechanical connecting mechanism 43 comprises an angle iron member 91 mounted above, and in parallel with, the vending slot 23 formed in the front side of the lower section of the cabinet. The angle iron member 91 supports left and right upwardly projecting ears 93 and 95, one being located at either end. A connecting shaft 97 projects through apertures in the ears 93 and 95. A left crank 99 is fixedly attached to the connecting shaft 97 on the outer side of the left ear 93 and projects rearwardly and upwardly inside of the cabinet. The left crank 99 includes a plurality of apertures 101 having axes that are parallel to the connecting shaft 97. One end of a tension wire 103 is looped through one of the apertures in the left crank 99. The other end of the tension wire 103 is looped through an aperture in the upper arm 53. Due to this manner of connection, when the connecting shaft 97 is rotated in the manner hereinafter described, the left crank through the tension wire 103 pulls the various arms and feeder shaft of the carriage section toward the front of the cabinet and the vending slot 23, against the pull of the return coil spring 79.

A right crank 105 is fixedly attached to the connecting shaft 97 on the outer side of the right ear 95. A link 107 connects the outer end of the right crank 105 to a handle shaft crank 109 in a rotatable fashion by the use of suitably oriented pins or bolts. The handle shaft crank 109 is mounted on the inner end of the operating handle shaft 45 which has the operating handle mounted on its outer end. A slot 111 is included in the link where it is connected to the handle shaft crank to allow for play in the movement of the operating handle crank. Moreover, the operating handle crank has a plurality of apertures 113 at this same connecting point to allow for adjustment.

Mounted on top of the feeder shaft 61 is a weight 114 and attached to the bottom of the feeder shaft 61 and the foot shaft 86 is a feeder foot 115. As illustrated in FIG. 2, the feeder foot 115 is generally T-shaped with the leg of the T connected to the bottoms of the feeder shaft 61 and the foot shaft 86. The feeder shaft connection is a pivotal connection in that a pair of ears 116 extend upwardly from the leg of the T on the right and left sides of the feeder shaft 61. The ears are connected to the feeder shaft by a pin 117 so that the feeder foot pivots in a plane generally parallel to the sides of the cabinet. While a pivot connection that pivots in only one plane is illustrated, if desired, a ball type pivot that pivots in more than one plane could be used. The foot shaft 86 is also pivotable in that it is suitably pinned by means not shown to the feeder foot 115.

As best shown in FIG. 2A, the arms of the T-shaped feeder foot 115 support angulated plates 119 that are attached thereto by bolts 121. The bolts have coil springs 123 located between their heads and the angulated plates 119 so that the plates are sprung downwardly. The rear portions of the plates 119 support downwardly projecting pins 125 which pass through apertures in the T-shaped feeder foot 115.

A horizontal shelf 127 is mounted in the lower section 13 of the cabinet 11. The plane of the shelf 127 is a predetermined distance beneath the slot 23. Preferably, this distance is about 2 inches because a stack of 100 newspapers/magazines of the type to be dispensed by this embodiment of this invention is about 4 inches high. As will be understood, this dimension is not to be considered critical. It is only provided to give a general idea of the range of operativeness so that the invention can be better understood. Thicker newspapers/magazines can also be vended by this embodiment of the invention.

The slot 23 comprises upper and lower sheet material elements 129 and 131 which are flared inwardly to form a generally inwardly projecting V-shaped slot. In other words, the slot is narrow at the face of the cabinet and flares inwardly in up and down directions. The lower flared member 131 drops down to meet the top of the shelf 127. Preferably, the inner width of the flared members is about equal to or less than the thickness of the stack of newspapers/magazines to be vended.

Turning now to a description of the operation of the embodiment of the invention illustrated in FIG. 2, when the operating handle 29 is rotated (which action, as previously described, only occurs after a coin has been inserted into the coin slot 27), the operating handle shaft crank 109 is moved by the rotation of the operating handle shaft 45. This action causes the link 107 to move generally upwardly as viewed in FIG. 2. Movement of the link 107 generally upwardly, through the action of the right crank 105, causes the connecting shaft 97 to rotate. Rotation of the connecting shaft 97 causes the left crank 99 to pull the tension wire 103 and the arms and feeder shaft of the carriage mechanism 42 toward the front of the newspaper/magazine vending machine. Movement of the arms of the carriage mechanism toward the front of the newspaper/magazine vending machine causes the feeder foot to move generally toward the front of the newspaper/magazine vending machine. Actually, the feeder shaft, the foot shaft and feeder foot move through a slight arc, the radius of which is determined by the length of the upper and lower arms 53 and 55 and the paralleling arm 85. In any event, this arcuate movement causes the upper newspaper/magazine (on which the feeder foot is resting) of a stack 132 of newspapers/magazines lying on the shelf 125 to move through a slight arc toward the vending slot 23. It should be noted at this point that the weight 114 is sufficient to embed pins 121 of the feeder foot into the top newspaper/magazine of the stack. This arcuate movement breaks the adherence between the upper newspaper/magazine and the next newspaper/magazine in the stack. Arcuate movement continues until the forward edge of the upper newspaper/magazine projects through the vending slot 23. The upper and lower sheet material elements 27 and 29 because of their flared shape tend to direct the newspaper or magazine toward the exit area of the vending slot. Preferably, the major fold of the newspapers/magazines in the stack 132 is on the right side of the stack as it is viewed in FIG. 2.

It will be appreciated from the foregoing description of one mechanism formed in accordance with the invention that a novel newspaper/magazine vending machine is provided by the invention. Because the invention uses arcuate motion to move the top newspaper/magazine from a stack of newspapers/magazines, the adherence problem which is prevalent in prior art machines is overcome without requiring the use of a complicated mechanism including stops or similar items. And, because the adherence problem is overcome, the invention is particularly useful for dispensing relatively thin newspapers/magazines such as, for example, "country type" newspapers.

Figure 3:
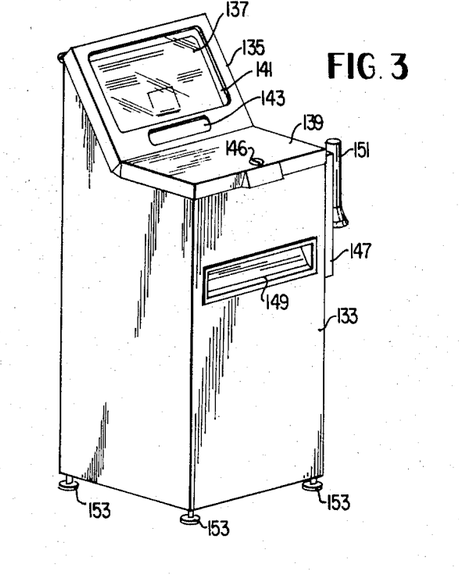
FIG. 3 is a pictorial diagram illustrating a second embodiment of a cabinet suitable for housing the mechanism of the invention.

FIG. 3 is a pictorial diagram illustrating a second embodiment of a cabinet 133 suitable for housing a mechanism formed in accordance with the invention. The cabinet 133 is generally box-shaped and includes a raised, generally triangular shaped (in cross-section), cab 135 for displaying a copy 137 of the newspaper/magazine being vended by the vending machine. More specifically, a lid 139 that generally follows the top surface configuration of the cabinet 133 includes a rear section that supports an inclined transparent window 141. Located behind the transparent window 141 is the copy 137 of the newspaper/magazine being vended. Also contained in the inclined portion of the lid 139 is a second transparent window 143. The second transparent window 143 has located behind it a "sold out" sign. If desired, the mechanism of the herein described invention can be used to control the appearance of this sign when the vending machine is empty.

Figure 3A:
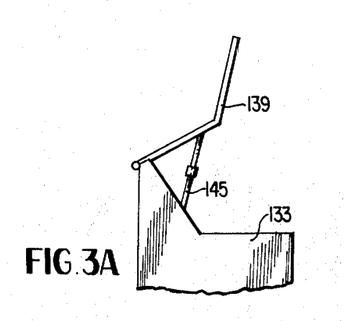
FIG. 3A is a side view of a portion of the cabinet illustrated in FIG. 3 with its lid raised.

FIG. 3A illustrates the lid 139 of the cabinet in its raised position. As can be seen, the lid is hinged in the rear and suitable hinged arms 145 maintain the lid in a raised position after it has been opened to a predetermined height. This height is sufficient to allow easy access to the interior of the machine so that a stack of newspapers/magazines of the type to be dispensed can be placed therein. A lock 146, located at the front of the lid, allows the lid to be locked closed in order to prevent unauthorized entry into the vending machine.

As with the cabinet illustrated in FIG. 1, the cabinet illustrated in FIG. 3 includes a coin box 147 mounted on its right side and a vending slot 149 located in its front side. The coin box controls the movement of a handle 151. More specifically, the handle 151 is mounted on a shaft (not viewable in FIG. 3) that passes through the coin box 147. The coin box controls whether or not the shaft is rotatable in accordance with whether or not a coin or coins have been inserted into the coin box in a conventional and well known manner.

In general, the cabinet 133 illustrated in FIG. 3 can be formed in a manner similar to the formation of the cabinet illustrated in FIG. 1 through the use of corner angles and sheet members. Alternatively, this cabinet can be formed of a continuous sheet of material suitably bent and connected to form the illustrated box-shaped structure. If desired, adjustable legs 153 can be attached to each of the four lower corners of the box so that it can be leveled.

Figure 4:
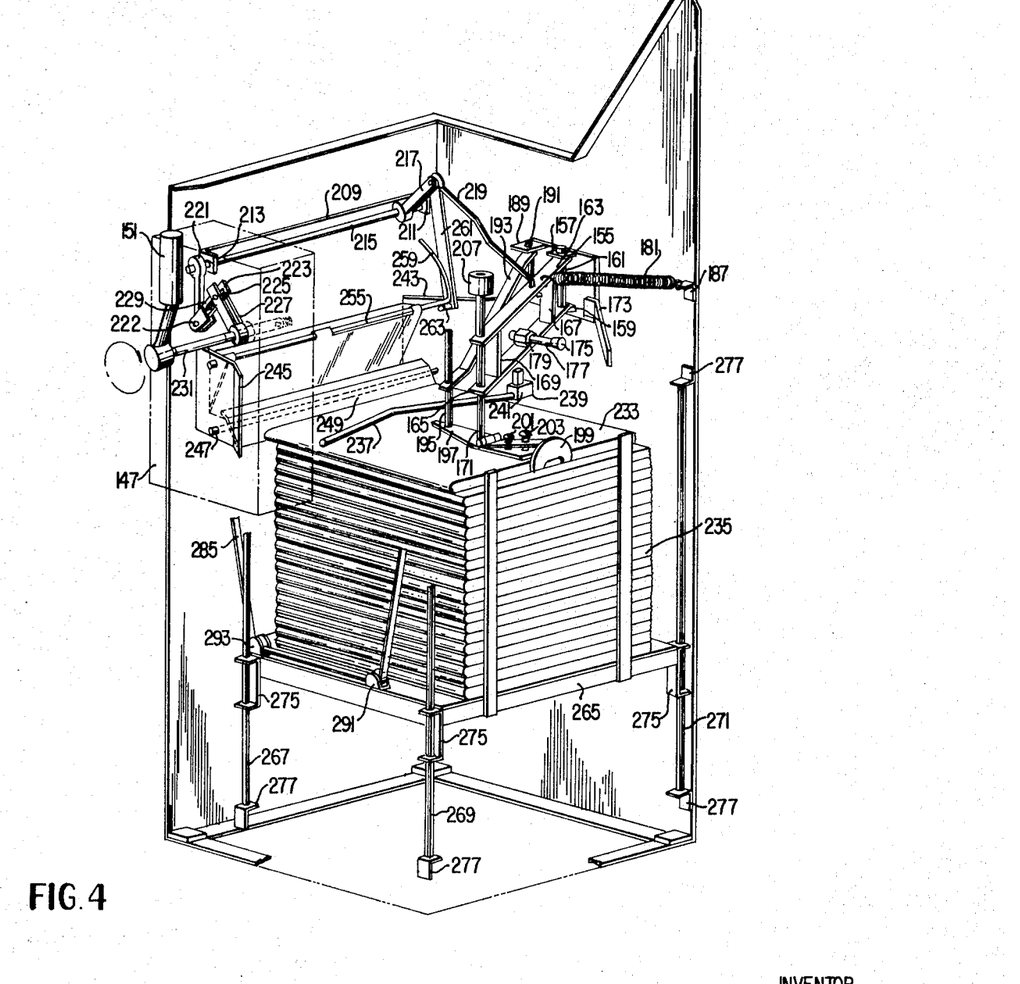
FIG. 4 is a pictorial diagram illustrating an alternate embodiment of the mechanism of the invention mounted in a cabinet of the type illustrated in FIG. 3.
Figure 4A:
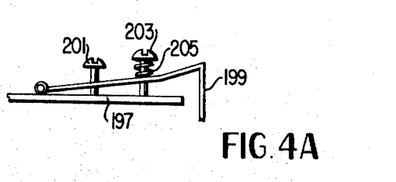
FIG. 4A is a cross-sectional diagram illustrating the feeder foot used in the embodiment of the mechanism illustrated in FIG. 4.

FIG. 4 is a pictorial diagram that illustrates an alternative embodiment of the mechanism of the invention mounted in a cabinet of the type illustrated in FIG. 3. In general, this mechanism operates in a manner similar to the mechanism illustrated in FIG. 2 and heretofore described. A carriage support bracket 155 is attached to one of the side walls of the cabinet 133 (the left wall as the cabinet is viewed in FIG. 3). The support bracket 155 has upper and lower inwardly projecting ears 157 and 159 and a vertically disposed carriage shaft 161 passes through apertures in the upper and lower ears 157 and 159. Upper and lower arms 163 and 165, respectively, are rotatably attached to the carriage shaft and project inwardly from the support bracket 155. The upper and lower arms are separated from one another by a pair of vertical separator bars 167 and 169.

A vertically disposed feeder shaft 171 rotatably passes through apertures in the outer ends of the upper and lower arms 163 and 165. A stop arm 173 coacts with a rubber bumper 175 mounted on a threaded shaft 177 that is threaded through a threaded opening in a nut-shaped element 179. The nut-shaped element 179 is fixedly attached to the lower arm 165. A coil return spring 181 is connected between an angle bracket 187 mounted to the left side or rear wall of the cabinet 133 and the upper arm 165. The return spring 181 forces the rubber bumper 175 against the stop arm 173.

A second pair of ears project outwardly from the carriage support bracket 155, in front of the first pair of ears. Only one of these ears 189 is viewable in FIG. 4. The second pair of ears support a paralleling shaft 191 which is vertically disposed and in parallel with the carriage shaft 161. A paralleling arm 193 projects outwardly from the paralleling shaft 191 so as to be generally parallel to a plane defined by the upper and lower arms 163 and 165. Located at the other end of the paralleling arm 193 is a generally vertically disposed support shaft 195. Hence, the support shaft 195 is parallel to the feeder shaft 171 and in front thereof.

Fixedly attached to the bottom of the vertically disposed support and feeder shafts 195 and 171, respectively, is a feeder foot plate 197. Hinged at about the center of the feeder foot plate 197 and extending rearwardly is a hook-shaped element 199. The hinge allows the hook-shaped element to raise and lower in a generally vertical plane. The hook portion of the hook-shaped element projects downwardly and its rear end is, preferably, relatively wide (i.e., in the order of one inch or more). As best illustrated in FIG. 4, a rear bolt 203 passes through an aperture in the arm of the hook-shaped element that is larger than the diameter of the bolt. This bolt is threaded into the feeder foot plate 197 and includes a spring 205 that is located between the head of the bolt and the arm of the hook-shaped element 199. The spring 205 forces the hook-shaped element downwardly toward the feeder foot plate yet allows the hook-shaped element 199 to raise slightly, if necessary, when it slides over a newspaper/magazine in the manner herein described. A front bolt 201 controls the action of the spring 205. More specifically, a front bolt 201 is threaded through the arm of the hook-shaped element 199 and presses against the feeder foot plate 197. This bolt controls how close the spring can press the hook-shaped element toward the feeder foot plate which in turn controls the depth of the lower edge of the hook-shaped element with regard to the bottom of the feeder foot plate.

It can be seen from the foregoing description and viewing FIG. 4 that a carriage and feeder foot mechanism of the type generally described previously with respect to FIG. 2 is therein illustrated and described. While some of the structural elements are slightly different in form and array, the general overall system is the same. If desired, a weight 207 can be mounted atop the feeder shaft 171 to force the feeder foot downwardly, however, because of the hereinafter described elevator mechanism, the weight is not absolutely necessary.

Mounted above the slot 149 and parallel therewith is a support bar 209 that has outwardly projecting ears 211 and 213. Passing through apertures in the ears 211 and 213 is a horizontally disposed connecting shaft 215. Fixedly attached to the connecting shaft 215 adjacent the rightmost ear 211 (as viewed in FIG. 4) is a first crank 217. The first crank 217 is connected to the upper arm 163 via a tension wire 219. The first crank projects generally upwardly and rearwardly with respect to the interior of the cabinet 133.

Fixedly attached to the connecting shaft adjacent the leftmost ear 213 (also as viewed in FIG. 4) is a second crank 221. The second crank generally projects downwardly. Attached to the other end of the second crank by a pin 222 is one end of a link 223. The other end of the link includes a slot 225. A suitable pin 229 connects a third crank 227 to the slot 225. The third crank 227 is mounted on the inner end of an operating handle shaft 231 that passes through the coin box 147 and is controlled thereby.

The foregoing system operates in a manner that is generally similar to the operation of the system illustrated in FIG. 2. More specifically, when a suitable coin or coins have been inserted into the coin box 147, the operating handle 151 is released. Thereafter, when a sufficient amount of force is applied to the operating handle, in the direction illustrated by the arrow in FIG. 4, it rotates the operating handle shaft 231. Rotation of the operating handle shaft 231 causes the third crank 227 to move the link 223. Movement of the link 223 through the action of the second crank 221 causes the connecting shaft 215 to rotate. When the connecting shaft rotates in the desired direction, the first crank 217 moves toward the front of the cabinet. Movement of the first crank 217 in this direction causes the tension wire 219 to move toward the front of the cabinet. This movement causes the upper and lower arms, and the paralleling arm, to move toward the front of the cabinet. As these elements move, the feeder foot plate 197 and its attached hook-shaped element 199 move forwardly. Because (as illustrated in FIG. 4) the feeder foot shaft is residing on the top newspaper/magazine 233 of a stack of newspapers/magazines 235, and the hook-shaped element is hooked over the rear of that newspaper/magazine, the top newspaper/magazine is moved toward the vending slot 149 as the feeder foot moves toward the front of the cabinet.

In order to keep the top newspaper/magazine flat during vending, a feeler arm 237 is provided. The feeler arm 237 is attached to a counterweight 239 and lies on top of the top newspaper/magazine 233 in front of the feeder foot plate 197. The feeler arm is located sufficiently far forward so that it does not prevent forward movement of the feeder foot plate 197. The counterweight has a square-shaped vertical aperture that is slidably mounted on a square-shaped vertically disposed shaft 241.

The mechanism of the invention illustrated in FIG. 4 is generally intended for use in vending relatively thick newspapers/magazines. Because the newspapers/magazines to be vended are relatively thick, the vending slot 149 must have a relatively wide opening. However, a relatively wide opening allows easy access to the interior of the cabinet whereby the newspapers/magazines could be easily stolen. In order to prevent this circumstance from occurring, the invention provides a novel vending slot closure mechanism for preventing access through the vending slot. This mechanism is pictorially illustrated in FIG. 4 and cross-sectionally illustrated in FIG. 6.

Figure 6:
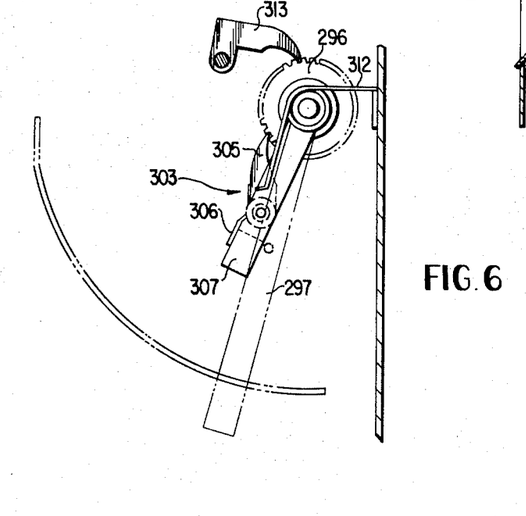
FIG. 6 is a cross-sectional diagram illustrating a ratchet assembly forming a part of the elevator mechanism; and, FIG. 7 is a cross-sectional diagram illustrating the delivery slot mechanism utilized in the embodiment of the mechanism illustrated in FIG. 4.

The vending slot closure mechanism includes right and left side plates 243 and 245 which may be formed of a sheet material, such as aluminum, for example. The side plates 243 and 245 project inwardly from either side of the vending slot 149 and are flanged outwardly near their inner ends. A horizontally disposed lower shaft 247 passes through the right and left side plates 243 and 245, beneath the lower lip of the vending slot 149. Fixedly attached to the lower shaft 247 is a curved plate 249. Located on the lower side of the inner edge of the curved plate 249 is a counterweight 251. The curved plate is formed and attached to the lower shaft 247 such that under normal circumstances the counterweight 251 rotates the lower shaft and raises the curved plate so that it lies in a generally inclined plane that points toward the vending slot 149. It should be noted that when a newspaper/magazine is to be vended, its weight is sufficient to rotate the curved plate 249 against the action of the counterweight 251 until the curved plate rests on a flange 253 that projects inwardly from the lower lip of the vending slot 149.

An upper shaft 255 also passes through the side plates 243 and 254. The upper shaft lies in parallel with, but above, the lower shaft 247 at about the elevation of the upper lip of the vending slot 149. A slot closure plate 257 is affixed to the upper shaft 255 and projects outwardly and downwardly to rest on the lower lip of the vending slot. When in this position the slot closure pate 257 closes the entire opening of the vending slot 149. A generally L-shaped bar 259 that is fixedly attached to the upper shaft projects rearwardly and upwardly from the upper shaft 255. The longest side of the L-shaped bar is furthest away and curves toward the front of the cabinet. An arm 261 projects downwardly from the first crank 217. The arm 261 includes an inwardly projecting pin 263 that coacts with the short side of the generally L-shaped arm 259. More specifically, prior to operation of the machine, the arm 261 is located in the solid line position illustrated in FIG. 6. In this position, the pin 263 is coacting with the short side of the L-shaped arm to prevent the slot closure plate 257 and the upper shaft 255 from rotating and allowing access through the vending slot 149. At this point, the generally curved plate is pointing generally upwardly and outwardly toward the vending slot 149 to further prevent access through the vending slot 149.

When the mechanism of the invention is operated in the previously described manner, the first crank 217 is rotated to the position illustrated by the dotted lines in FIG. 6. When this occurs, the arm 261 moves to the position illustrated by its respective dotted line. This movement moves the pin 263 out of contact with the short side of the L-shaped bar 259. Movement of this pin releases the L-shaped bar and the slot closure plate 257 so that when a newspaper/magazine to be vended approaches the vending slot, it first rotates the curved plate 249 downwardly, then it rotates the slot closure plate 257 upwardly and, finally, it exits through the opening thusly created.

Because the structure illustrated in FIG. 4 is intended to vend relatively thick newspapers/magazines, it is necessary to provide an elevator mechanism for raising the stack of newspapers/magazines in order that a relatively large number of newspapers/magazines can be vended without requiring the continuous additional of more newspapers/magazines. Moreover, it is desirable that the incremental amount that the elevator platform is raised each time a newspaper/magazine is vended be variable in order that newspapers/magazines of varying thicknesses can be vended. An elevator mechanism formed in accordance with the invention and suitable for meeting these objects is pictorially illustrated in FIG. 5 and hereinafter described.

Figure 5:
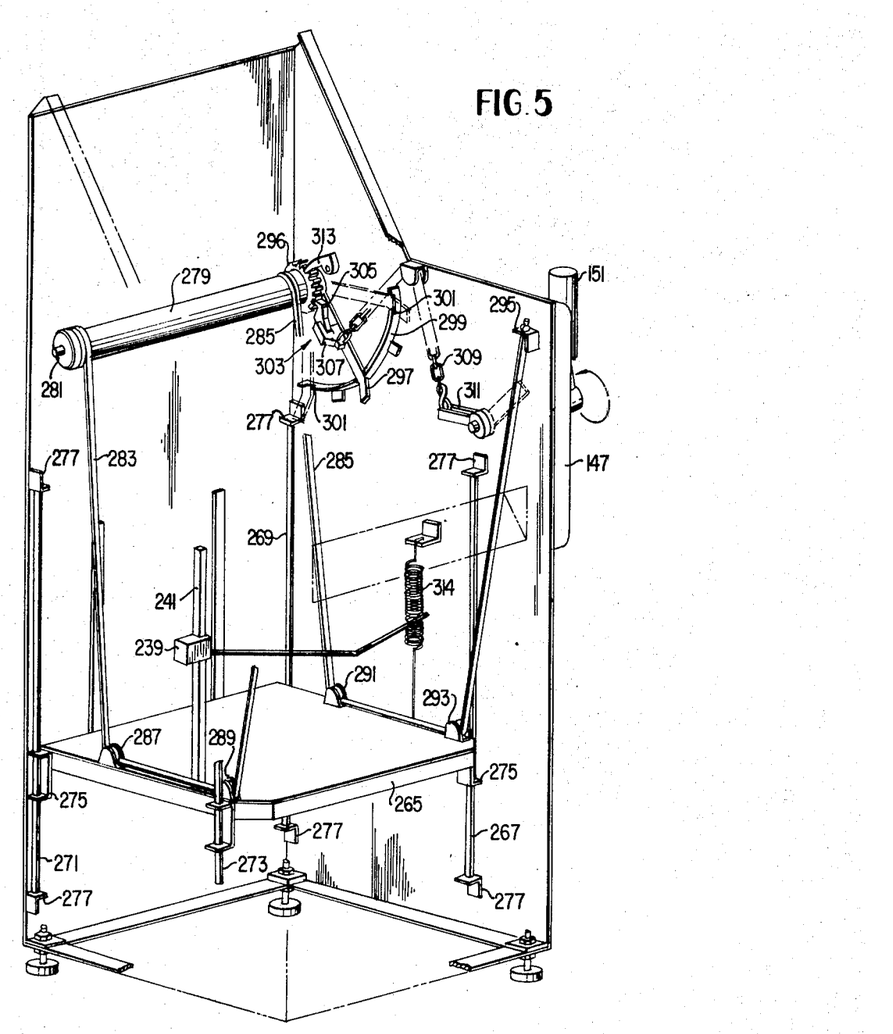
FIG. 5 is a pictorial diagram illustrating an elevator mechanism suitable for use with the embodiment of the mechanism illustrated in FIG. 4.

The elevator mechanism of the invention comprises a platform 265 upon which the horizontally disposed stack of newspapers/magazines 235 rests. The platform is maintained in the desired horizontal alignment by being slidably attached to four vertically disposed, cylindrical shafts 267, 269, 271 and 273. More specifically, attached to each of the four corners of the platform 265 is a U-shaped bracket 275. Each U-shaped bracket has a pair of vertically aligned apertures through which one of the four cylindrical shafts pass. Hence, the plateform is slidably attached to the four cylindrical shafts. Each of the cylindrical shaft is supported on either end by an angle bracket 277. The angle brackets 277 are fixedly attached to the sides of the cabinet. It will be appreciated that this arrangement allows the platform 265 to slide up and down while remaining in a generally horizontal plane.

The elevator mechanism that raises the platform 265 in increments is best illustrated in FIG. 5 and comprises a drum 279 which is mounted about a horizontally disposed, rotatable shaft 281. The shaft 281 is mounted by means not shown near the rear of the cabinet 133, above the platform 265. Wrapped around the two ends of the drum are first and second cables 283 and 285. The cables essentially move in vertical planes located on either side of the platform 265. The first cable 283 passes through first and second pulleys 287 and 289 attached to the upper surface of the platform 265 on one side of the platform. The other end of the first cable 283 is affixed to a bracket (not shown in FIG. 5) attached to the front of the cabinet. The second cable 285 passes through third and fourth pulleys 291 and 293 attached to the other side of the upper surface of the platform 265. The second cable 285 ends at a bracket 295 attached to the front of the cabinet 133. As the drum 279 is rotated, the cables 283 and 285 are wound upon or wound from the outer periphery of the drum. This winding causes the platform 265 to raise or lower, as the case may be.

Figure 7:
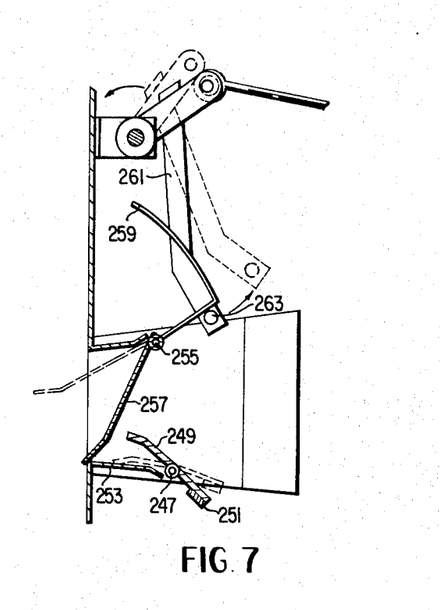

FIGS. 5 and 7 illustrate the mechanism for controlling the amount of rotation of the drum 279 each time a newspaper/magazine is vended. It will be appreciated that controlling the amount of rotation of the drum 279 each time a newspaper/magazine is vended also controls the amount the platform 265 is raised each time a newspaper/magazine is vended. This mechanism comprises a ratchet assembly illustrated in cross-section in FIG. 7 and pictorially in FIG. 5.

The ratchet assembly comprises a ratchet gear 296 fixedly attached to the drum 279. An arm 297 is rotatably attached to the shaft 281 upon which the ratchet gear 296 and the drum 297 are mounted. The arm is moveable to spaced locations about an arcuate bracket 299 which is fixedly attached to one side of the cabinet 133. The arcuate bracket 299 includes a plurality of notches 301 into which the arm 297 can be moved. Hence, the notches maintain the arm 297 in fixed positions. Mounted on the arm 297 is a spring loaded dog mechanism 303. The spring loaded dog mechanism 303 is mounted such that a dog 305 is forced by a spring 306 into the teeth of the ratchet gear 296. The spring loaded dog mechanism is swivelly attached to the arm 297 by a swivel bracket 307. The swivel bracket 307 is connected via a chain 309 to a crank 311 which is attached to the operating handle shaft 231 so that each time the operating handle shaft 231 is moved by the movement of the operating handle 151, tension is placed on the chain 309. This tension causes the swivel bracket 307 to swivel against the action of a spring 312. This swivel action causes the dog 305 to move the ratchet gear 296 through a predetermined arc. The amount of the arc movement is determined by the positioning of the arm 297. A lock dog 313 is mounted above the dog 305 in a suitable position for engagement with the teeth of the ratchet gear 296. The lock dog 313 locks the ratchet gear 296 in position after it has been moved by the action of the dog 305. In other words, return movement of the ratchet gear 296 and the drum 279 is prevented by the lock dog 313 when return movement of the swivel bracket 307 and the dog is created by the spring 312. In order to ease the torque on the operating handle each time the elevator is raised, an equalizing spring 314 is connected between the platform 265 and a side of the cabinet 133.

It will be appreciated from the foregoing description of the preferred embodiments of the invention that a newspaper/magazine vending machine that overcomes many problems of the prior art is provided by the invention. In accordance with one embodiment, the mechanism of the invention is suitable for dispensing relatively thin newspapers/magazines, such as "-country-type" newspapers. In an alternative arrangement, the newspaper/magazine vending machine mechanism can dispense relatively thick newspapers such as that produced in metropolitan areas, Hence, the invention is suitable for use over a wide range (i.e., from relatively thin items to relatively thick items). Further, the mechanism of the invention can be designed such that it can be utilized to dispense relatively thin newspapers/magazines as well as relatively thick newspapers/magazines. More specifically, if the elevator platform is raised to a predetermined height and locked in place and if the hook-shaped foot is changed to a pin-type foot, the FIGS. 4-7 embodiment can be used to dispense relatively thin newspapers. Moreover, the various parts of the various embodiments of the invention can be made interchangeable. For example, the overall carriage mechanism, the horizontal shaft for controlling the operation of the carriage mechanism, the coin box and the operating arm mechanism can be made interchangeable between the two described embodiments of the invention. Hence, not only is the invention versatile in use, it is also versatile in structure.

While preferred embodiments of the invention have been illustrated and described, it will be appreciated by those skilled in the art and others that various changes can be made therein without departing from the scope of the invention. Hence, the invention can be practiced otherwise than as specifically described herein.

The embodiments of the invention in which an exclusive property or privilege is claimed are defined as follows:

1. A periodical vending machine for vending periodicals from the top of a stack of generally horizontally disposed periodicals said periodical vending machine comprising:
   1. a cabinet having a vending slot located in one face:
   2. a feeder mechanism mounted in said cabinet, said feeder mechanism comprising:
      a. a carriage mechanism including at least one arm, said arm being mounted at one end for rotational movement so as to scribe an arc in a generally horizontal plane;
      b. a vertically disposed feeder shaft mounted on the other end of said arm; and,
      c. a feeder foot element attached to the lower end of said feeder shaft, said feeder foot element including engagement means for engaging the top periodical of said stack of generally horizontally disposed periodicals;
   3. a platform mounted in said cabinet beneath said feeder foot element for supporting said stack of generally horizontally disposed periodicals;
   4. an operating mechanism including a handle mounted on the exterior of said cabinet; and,
   5. a mechanical connecting mechanism connecting said feeder mechanism to said operating handle so that when said operating handle is operated in a predetermined manner, said arm of said carriage mechanism rotates said feeder shaft and said feeder foot element in an arcuate path around said one end of said arm whereby said engagement means moves said top periodical through said vending slot in said cabinet.

2. A periodical vending machine as claimed in claim 1 including a weight mounted on top of said feeder shaft; and, wherein said engagement means includes a plurality of pins that project downwardly to engage said top newspaper/magazine.

3. A periodical vending machine as claimed in claim 2 including a spring return means connected between a wall of said cabinet and said carriage mechanism for returning said arm, said feeder shaft and said feeder foot element to a predetermined position when said operating handle is released.

4. A periodical vending machine as claimed in claim 3 wherein said carriage mechanism also comprises:
   a vertically disposed carriage shaft, said arm rotatably attached to said carriage shaft and extending outwardly from a point near the lower end of said carriage shaft; and,
   a second arm rotatably attached to said carriage shaft and extending outwardly and downwardly to a point where it joins said arm.

5. A periodical vending machine as claimed in claim 4 including:
   a paralleling shaft mounted in parallel with said carriage shaft; and,
   a paralleling arm projecting outwardly from said paralleling shaft and held parallel with the arms of said carriage mechanism.

6. A periodical vending machine as claimed in claim 5 wherein said mechanical connecting mechanism comprises:
- a horizontally disposed shaft rotatably mounted in said cabinet;
- a first crank extending outwardly from one end of said horizontally disposed shaft;
- a tension wire connecting the outer end of said first crank to one of said arms of said carriage mechanism;
- a second crank extending outwardly from the other end of said horizontally disposed shaft; and,
- a linkage for connecting said second crank to said operating mechanism.

7. A periodical vending machine as claimed in claim 6 wherein said slot includes sheet material members that flare inwardly inside the interior of said cabinet.

8. A newspaper/magazine vending machine as claimed in claim 7 including:
- a display cab mounted on top of said cabinet; and,
- a coin box mechanism operatively connected to said operating mechanism so as to prevent said handle from being operated until a predetermined coin combination is inserted into said coin box.

9. A periodical vending machine as claimed in claim 1 including an elevator mechanism mounted in said housing and connected to said operating mechanism and said platform so that said platform is raised a predetermined increment each time the handle is operated.

10. A periodical vending machine as claimed in claim 9 wherein said elevator mechanism includes:
- a horizontally disposed drum rotatably mounted in said cabinet above said platform;
- a plurality of pulleys mounted on said platform in a predetermined array; and,
- at least one cable, said cable being wound about said drum at one end, passing through said pulleys and affixed at the other end to a bracket mounted in said cabinet.

11. A periodical vending machine as claimed in claim 10 including means for preventing entry through said vending slot, said means being connected to said mechanical connecting mechanism and being releasable by said mechanical connecting mechanism when said handle is operated.

12. A periodical vending machine as claimed in claim 1 including means for preventing entry through said vending slot, said means being connected to said mechanical connecting mechanism and being releasable by said mechanical connecting mechanism when said handle is operated.

13. A periodical vending machine as claimed in claim 1 wherein said engagement means includes a hook-shaped element that engages the rear of said top periodical.

14. A periodical vending machine as claimed in claim 13 including a spring return means connected between a wall of said cabinet and said carriage mechanism for returning said arm, said feeder shaft and said feeder foot element to a predetermined position when said operating handle is released.

15. A periodical vending machine as claimed in claim 14 wherein said carriage mechanism also comprises:
- a vertically disposed carriage shaft, said arm rotatably attached to said carriage shaft and extending outwardly from a point near the lower end of said carriage shaft; and,
- a second arm rotatably attached to said carriage shaft and extending outwardly from a point near the upper end of said carriage shaft, said feeder shaft being held in a vertical position by passing through apertures in the outer ends of said arms.

16. A periodical vending machine as claimed in claim 15 including:
- a paralleling shaft mounted in parallel with said carriage shaft; and,
- a paralleling arm projecting outwardly from said paralleling shaft and held parallel with the arms of said carriage mechanism.

17. A periodical vending machine as claimed in claim 16 wherein said mechanical connecting mechanism comprises:
- a horizontally disposed shaft rotatably mounted in said cabinet;
- a first crank extending outwardly from one end of said horizontally disposed shaft;
- a tension wire connecting the outer end of said first crank to one of said arms of said carriage mechanism;
- a second crank extending outwardly from the other end of said horizontally disposed shaft; and,
- a linkage for connecting said second crank to said operating mechanism.

18. A periodical vending machine as claimed in claim 17 including:
- a display cab mounted on top of said cabinet; and,
- a coin box mechanism operatively connected to said operating mechanism so as to prevent said handle from being operated until a predetermined coin combination is inserted into said coin box.

19. A periodical vending machine as claimed in claim 18 including an elevator mechanism mounted in said housing and connected to said operating mechanism and said platform so that said platform is raised a predetermined increment each time the handle is operated.

20. A periodical vending machine as claimed in claim 19 wherein said elevator mechanism includes:
- a horizontally disposed drum rotatably mounted in said cabinet above said platform;
- a plurality of pulleys mounted on said platform in a predetermined array; and,
- at least one cable, said cable being wound about said drum at one end, passing through said pulleys and affixed to at the other end to a bracket mounted in said cabinet.

21. A periodical vending machine as claimed in claim 20 including means for preventing entry through said vending slot, said means being connected to said mechanical connecting mechanism and being releasable by said mechanical connecting mechanism when said handle is operated.

* * * * *